Patented Mar. 16, 1943

2,313,901

UNITED STATES PATENT OFFICE 2,313,901

REFINING OF ROSIN ESTERS

William N. Traylor, Hattiesburg, Miss., assignor to Hercules Powder Company, Wilmington, Del., a corporation of Delaware No Drawing. Application April 18, 1941, Serial No. 389,177

12 Claims. (Cl. 260—103)

This invention relates to rosin esters and more particularly to a process for refining rosin esters.

Rosin esters have become very important commercially because of certain advantages which they possess over raw and hardened rosins. Thus, being substantially neutral, and covering a wide range of other properties governed by the particular alcohol with which the rosin is esterified, they may be extensively used in fields such as the varnish industry in which the high acidity and limited ranges of other properties of raw and hardened rosins may be undesirable.

However, the preparation of the especially valuable pale-colored rosin esters has been difficult because of the darkening which generally occurs under the conditions of the esterification process. Moreover, the known methods for refining these esters to produce pale-colored products generally results in low yields of refined product, or in change of other properties of the ester or require expensive apparatus and reagents. Thus, the methods of solvent extraction and distillation generally result in substantially decreased yield of refined esters, whereas such treatments as catalytic hydrogenation are costly in materials and equipment and may change the properties of the ester.

It is an object of this invention to provide an improved method of refining rosin esters.

It is a further object to provide a process for refining rosin esters which will provide a refined product in substantially quantative yield based on the rosin ester treated.

It is a still further object to provide a process for refining rosin esters which is extremely simple and economical.

Another object of this invention is to provide a process for refining rosin esters which will not substantially alter the properties of the rosin esters treated other than color.

Other objects of the invention will appear hereinafter.

The objects of this invention, in general, are accomplished by treating rosin esters with nascent hydrogen. The treatment is carried out under conditions which will provide intimate contact between the rosin esters and the nascent hydrogen. As a result, the color of the rosin esters becomes substantially lightened with practically no loss in yield and no perceptible effect on the other physical properties.

In accordance with the process of this invention the treatment may be carried out on the rosin esters in the molten condition or it may be carried out on the rosin esters dissolved in a suitable organic solvent. After the treatment of the rosin esters is completed, the rosin esters or the solution of rosin esters may be washed to remove any water-soluble material and filtered to remove any suspended matter. In the case of treatment of the rosin esters in solution, the rosin esters of improved color may then be recovered by evaporation of the solvent.

The process of this invention is applicable to any of the various types of rosin esters or mixtures thereof. Thus, the esters of wood rosin, gum rosin or heat treated or polymerized rosin with mono- or polyhydric alcohols may be used in the process of the invention. For example, rosin esters of monohydric alcohols such as methyl, ethyl, amyl, stearyl, abietyl, and hydrogenated abietyl alcohols, or ethylene glycol monoethyl ether or dihydric alcohols as ethylene glycol, diethylene glycol, or polyhydric alcohols such as glycerin, diglycerin, pentaerythritol or mannitol are suitable. Rosin esters produced by any of the usual methods such as esterification at high temperatures with or without catalysts such as benzene sulfonic acid, zinc, etc., are suitable.

As solvents for the rosin esters where the treatment is carried out on the rosin esters in solution, any solvent for the rosin esters which is itself inert in the treatment may be employed. Among such solvents are, for example, monocyclic aromatic hydrocarbons, such as benzol, toluol, xylol, etc.; petroleum hydrocarbons such as gasoline, V. M. and P. naphtha, hexane, heptane, etc.; hydrogenated petroleum hydrocarbons, such as those known in the trade as "Solvesso" solvents; and solvents such as ethylene dichloride, carbon tetrachloride, cyclohexane, methyl-cyclohexane, tetrahydro and decahydronaphthalenes, etc. Where the treatment is carried out on the rosin esters in solution, the concentration of the rosin esters in solution is not critical and may be selected so as to provide adequate workability of the solution. In general, a concentration within the range of about 10 to about 75% by weight may be used, but preferably the concentration is held within the range of about 30% to 50% by weight. If desired, where rosin esters are refined in the molten state, solvent may be added after the refining step to aid in the separation of the refining agent from the rosin esters or in the water washing of the esters.

The nascent hydrogen for use in the treatment of the rosin ester in accordance with this invention may be derived by any of the well-known procedures for generating nascent hydrogen. Preferably, the nascent hydrogen may be provided by the reaction of an acid reactant with a metal above hydrogen in the electromotive series. The acid reactant may be either an acid or an acid salt or a mixture thereof. Among the acid reactants which may be used are, for example, hydrochloric acid, sulfuric acid, phosphoric acid, acetic acid, sodium acid sulfate, potassium acid sulfate, monosodium acid phosphate, calcium acid phosphate, etc. The preferred acid reactants are the acid salts, sodium acid sulfate being particularly effective.

Any of the metals above hydrogen in the electromotive series may be employed. It will be preferable, however, to use such metals which form salts having no appreciable discoloring action on the rosin esters. The metals are used preferably though not necessarily in a finely divided form. Use of metals such as, for example, cadmium, aluminum, manganese, tin, and zinc is very desirable. Zinc in the form of zinc dust, mossy zinc, or zinc powder is particularly well adapted to the process. It will be desirable that at least a small amount of water or of some other ionizing solvent be present to accelerate the refining action. Use of an aqueous acid or of the hydrate of an acid salt will provide the desired ionizing effect. It will be understood that the acid reactant and the metal are both in contact with the rosin esters during the treatment.

The nascent hydrogen may likewise be produced electrolytically. When using nascent hydrogen produced by electrolysis the rosin esters dissolved in a solvent may, for example, be placed in a suitable electrolytic cell, an acid solution or an aqueous salt solution may then be added to provide ionization and a direct current may then be passed through the cell for the length of time dependent on the current and the degree of refining desired.

It is desirable to employ vigorous agitation in carrying out the treatments to obtain thorough contact of the reactants and to accelerate the refining action. The speed with which the rosin esters become refined is also dependent on the temperature employed in the treatment. While the treatment may be carried out at room temperature with the rosin esters dissolved in a suitable solvent, the rate of refining is rather slow for practical purposes. It is preferable to carry out the treatment at elevated temperatures and temperatures as high as 200° C. have been found to be satisfactory although higher temperatures are possible. A temperature within the range of about 70° C. to about 125° C. is preferable. When carrying out the treatment of the rosin esters in solution, it is convenient to carry out the treatment at the reflux temperature of the solvent. Where the treatment is to be carried out above the normal boiling point of the solvent, use of superatmospheric pressure is resorted to. The pressures employed are in no way limiting on the process, and the equipment employed will generally determine the maximum pressure which is practical.

The time of treatment of the rosin esters may be varied to produce the result desired. The time necessary to provide satisfactory refining of the rosin esters will be dependent on such factors as the amount of color bodies present in the rosin ester, the temperature of treatment, the amount of nascent hydrogen utilized, etc. For this reason, it is impossible to state any definite time necessary, except in relation to a given set of conditions. The examples given hereinafter will serve to illustrate the kind of treatment which may be used in any particular case.

The amount of acid reactant used for producing nascent hydrogen, when this method of generating nascent hydrogen is employed, may vary over a wide range, depending on such factors as the particular acid reactant used, the degree of refining desired, the particular conditions of treatment, as well as other factors. Assuming the acid reactant to be on an anhydrous basis, ratios of rosin ester to acid reactant as high as 40 to 1 on a weight basis have been used. In general, however, ratios varying between 10 of rosin ester to 1 of acid reactant down to 1 of rosin ester to 1 of acid reactant are desirable. A preferred ratio is approximately 3 of rosin ester to 1 of acid reactant.

The concentration of the acid reactant in terms of ionizing solvent may also be widely varied, for example, sulfuric acid may be used as the acid reactant in concentration of from 3% to 60% in aqueous solution, while acetic acid may be used in the substantially anhydrous form of glacial acetic acid, as well as in an aqueous solution. When acids are used as the acid reactants, however, concentrations of acid of 20 to 50% are generally preferable. When using acid salts as acid reactants, a hydrate or an aqueous solution from a concentration of about 5% by weight to a saturated solution may be employed. The monohydrate of sodium acid sulfate, for example, is a particularly effective acid reactant in the process according to the invention.

The amount of metal above hydrogen in the electromotive series which is employed is not particularly critical. It will be preferable, however, to have such an amount of metal present which will be an excess over the theoretical amount required to react with the acid reagent present.

The process of refining rosin esters in accordance with this invention may also be carried out as a continuous process if desired. Thus, for example, the rosin ester solution may be treated with the acid reactant and the metal above hydrogen in the electromotive series in a suitable vessel while additional rosin ester solution is fed into the vessel continuously and refined rosin ester solution withdrawn from the vessel at substantially the same rate. The acid reactant and metal may be replenished as necessary and the refined solution passed to a continuous evaporator for removal of the solvent.

The use of an inert atmosphere such as $N_2$ or $CO_2$ during the various refining steps is often of assistance in obtaining pale colors. This may be particularly helpful during washing of treated rosin ester solutions or in the evaporation of solvents therefrom.

As illustrative of the improved process of refining rosin esters in accordance with this invention, the examples appearing below are cited as typical of the various embodiments. The colors shown in the examples are the Lovibond glass colors measured on ⅞" cubes of the rosin esters.

Example I

A nearly black crude methyl abietate obtained by high temperature direct esterification of rosin with methyl alcohol was refined with various treating agents. Solutions containing 62 parts by weight of this ester and 190 parts by weight of solvent were refluxed separately for one hour with the parts by weight of refining agents as shown in Table I below. Each treated solution after cooling was decanted, washed with water, filtered to remove metal remaining, and the rosin ester then recovered by distilling off the solvent in vacuo. There was no loss of material in the treatment.

*Table I*

| Sample No. | Treating agent | | Solvent | Standard U. S. rosin type | Lovibond color |
|---|---|---|---|---|---|
| | Metal | Acid reactant | | | |
| 1 | 20 parts Zn powder | 30 parts $NaHSO_4.H_2O$ | Benzene | WW | 22 amber. |
| 2 | 30 parts Fe powder | 30 parts aqueous 10% HCl. | do | K | 55 amber. |
| 3 | 20 parts Zn powder | 50 parts glacial acetic acid. | do | I | 80 amber+0.25 red. |
| 4 | 20 parts Sn mossy | 50 parts aqueous 10% HCl. | Ethylene dichloride | G+ | 80 amber+8 red. |

EXAMPLE II

Fifty parts by weight of the nearly black crude methyl abietate of Example I, was agitated with a mixture of 7.5 parts by weight of zinc powder and 10.5 parts by weight of sodium acid sulfate monohydrate for one-half hour at a temperature of 120° C.

After cooling, the rosin ester was extracted with 175 parts of toluene. The rosin ester solution was then filtered to remove small amounts of dispersed zinc, and the solvent removed from the filtered solution under reduced pressure. The refined methyl abietate graded M, U. S. Standard rosin type, or 45 Amber, Lovibond Color.

EXAMPLE III

An ester gum prepared by esterification of WW gum rosin with glycerin and having a color I, a melting point of 105° C. and an acid number of 6 was refined with several types of treating agents. Solutions containing 62 parts by weight of the ester gum and 190 parts by weight of solvent were refluxed separately over the refining agent for one hour. The ester was recovered as in Example I, and with no loss of material in the treatment. A table showing the type and parts by weight of treating agent, and solvent, and the color of the refined ester gum for each treatment follows.

What I claim and desire to protect by Letters Patent is:

1. A process for refining a rosin ester which comprises treating said rosin ester with nascent hydrogen in the presence of an acidic reactant containing ionizable hydrogen and in the presence of at least a small amount of water.

2. A process for refining a rosin ester which comprises treating said rosin ester dissolved in a suitable solvent with nascent hydrogen in the presence of an acidic reactant containing ionizable hydrogen and in the presence of at least a small amount of water.

3. A process for refining a rosin ester which comprises treating said rosin ester with nascent hydrogen formed by the reaction of an acidic reactant containing ionizable hydrogen and a metal above hydrogen in the electromotive series in contact with said rosin ester and in the presence of at least a small amount of water.

4. A process for refining a rosin ester which comprises treating said rosin ester dissolved in a suitable solvent with nascent hydrogen formed by the reaction of an acidic reactant containing ionizable hydrogen and a metal above hydrogen in the electromotive series in contact with the rosin ester solution and in the presence of at least a small amount of water.

5. A process for refining a rosin ester which comprises treating said rosin ester dissolved in a suitable solvent with nascent hydrogen formed by the reaction of an acid and a metal above hydrogen in the electromotive series in contact with the

*Table II*

| Sample No. | Treating agent | | Solvent | Standard U. S. rosin type | Lovibond color |
|---|---|---|---|---|---|
| | Metal | Acid reactant | | | |
| 1 | 20 parts Zn powder | 30 parts $NaHSO_4.H_2O$ | Benzene | WG+ | 24 amber. |
| 2 | 20 parts Fe powder | 30 parts aqueous 10% HCl. | do | I+ | 80 amber. |
| 3 | 10 parts Zn powder | 50 parts glacial acetic acid. | do | M | 45 amber. |
| 4 | 20 parts Sn mossy | 50 parts aqueous 10% HCl. | Ethylene dichloride | K | 55 amber. |
| 5 | 20 parts Zn powder | 60 parts aqueous 10% HCl. | Ethylene dichloride | WW | 22 amber. |
| 6 | 20 parts Sn powder | 60 parts aqueous 10% HCl. | do | M | 45 amber. |
| 7 | 20 parts Zn powder | 60 parts aqueous 40% $H_2SO_4$. | Narrow range gasoline | M | Do. |

It is to be understood that the term "refining" used throughout this invention refers particularly to the color improvement of the rosin esters and not necessarily to a separation of the rosin esters into light-colored and dark-colored fractions.

It will also be understood that the details and examples hereinbefore set forth are illustrative only, and that the invention as broadly described and claimed is in no way limited thereby.

rosin ester solution and in the presence of at least a small amount of water.

6. A process for refining a rosin ester which comprises treating said rosin ester dissolved in a suitable solvent with nascent hydrogen formed by the reaction of a metal above hydrogen in the electromotive series and an acid salt in contact with the rosin acid solution and in the presence of at least a small amount of water.

7. A process for refining a rosin ester which comprises treating said rosin ester dissolved in a suitable solvent with nascent hydrogen formed by the reaction of sodium acid sulfate and a metal above hydrogen in the electromotive series in contact with the rosin ester solution and in the presence of at least a small amount of water.

8. A process for refining a rosin ester which comprises treating said rosin ester dissolved in a suitable solvent with nascent hydrogen formed by the reaction of an acidic reactant containing ionizable hydrogen and zinc in contact with the rosin ester solution and in the presence of at least a small amount of water.

9. A process for refining a rosin ester which comprises treating said rosin ester dissolved in a suitable solvent with nascent hyrogen formed by the reaction of sodium acid sulfate and zinc in contact with the rosin ester solution and in the presence of at least a small amount of water.

10. A process for refining a rosin ester which comprises treating said rosin ester dissolved in a suitable solvent with nascent hydrogen formed by the reaction of zinc and sodium acid sulfate monohydrate in contact with the rosin ester solution and in the presence of at least a small amount of water.

11. A process for refining a rosin ester which comprises treating said rosin ester dissolved in a suitable solvent with nascent hydrogen formed by the reaction of an acidic reactant containing ionizable hydrogen and a metal above hydrogen in the electromotive series in contact with the rosin ester solution, at a temperature within the range of about 70° to about 125° C. and in the presence of at least a small amount of water.

12. A process for refining a rosin ester which comprises treating said rosin ester dissolved in a suitable solvent with nascent hydrogen formed by the reaction of sodium acid sulfate monohydrate and zinc in contact with the rosin ester solution at a temperature within the range of about 70° to about 125° C.

WILLIAM N. TRAYLOR.